United States Patent [19]

Leva

[11] 4,376,081
[45] Mar. 8, 1983

[54] TOWER PACKING

[76] Inventor: Max Leva, 5600 Munhall Rd., Pittsburgh, Pa. 15217

[21] Appl. No.: 150,443

[22] Filed: May 16, 1980

[51] Int. Cl.$^3$ .............................................. B01F 3/04
[52] U.S. Cl. ..................................... 261/94; 202/158; 210/150; 261/DIG. 72
[58] Field of Search ..................................... 261/94–98, 261/DIG. 72; 202/158; 210/150, 151

[56] References Cited

U.S. PATENT DOCUMENTS

| | | | |
|---|---|---|---|
| 2,602,651 | 7/1952 | Cannon | 261/DIG. 72 |
| 3,266,787 | 8/1966 | Eckert | 261/DIG. 72 |
| 3,311,356 | 3/1967 | Eckert | 261/DIG. 72 |
| 4,014,962 | 3/1977 | Del Notario | 261/DIG. 72 |
| 4,067,936 | 1/1978 | Ellis et al. | 261/DIG. 72 |
| 4,086,307 | 4/1978 | Glaspie | 261/DIG. 72 |
| 4,256,673 | 3/1981 | Braun | 261/DIG. 72 |

FOREIGN PATENT DOCUMENTS

| | | |
|---|---|---|
| 1945048 | 3/1971 | Fed. Rep. of Germany ... 261/DIG. 72 |
| 2603124 | 8/1976 | Fed. Rep. of Germany ... 261/DIG. 72 |
| 2821186 | 11/1978 | Fed. Rep. of Germany ... 261/DIG. 72 |

*Primary Examiner*—Richard L. Chiesa
*Attorney, Agent, or Firm*—Carothers and Carothers

[57] ABSTRACT

A tower packing element for use in towers for distillations, gas absorptions and related mass transfer operations. The base of the element has a surface contour which is generated by the rotation of a two-dimensional curve having reverse curvature through an approximate angle range of from ten to one hundred and eighty degrees around a straight line which lies within the plane of said curve. The base is further provided with slots and depending tongues.

4 Claims, 8 Drawing Figures

TOWER PACKING

This invention relates to a new tower packing that is used in dumped beds in towers which are commonly used in distillation, gas absorption and related mass transfer operations.

It is well known from the state of the art that in order for a dumped tower packing to provide optimum results in mass transfer, the resulting poured bed should contain the individual elements in as random an arrangement as possible. Furthermore, it is important to provide a packed bed that comprises as many mutual contact points between the individual elements, that are contained in the bed, as possible. In this way, a homogeneous liquid distribution is achieved as far as is possible throughout the bed, with as efficient a degree of wetting of the packing surface as may be expected. This will then generate a maximum amount of interfacial surface area between the liquid and gas or vapor phases which are involved in the process, with the result that optimum mass transfer rates are achieved.

Another object is to endow the tower packing elements with as much mechanical strength as possible, without using an overly large amount of construction material. A further objective is to provide a tower packing element with such a shape that will permit mutual interlocking with adjoining pieces in order to form a randomly poured bed of maximum stability. These features are important because with such randomly poured beds of maximum stability, there is a minimum of settling of the packing in the tower once the packed bed has been built up in the tower, which means that optimum operating stability is achieved as far as mass transfer and pressure drop are concerned.

There are additional desirable features which the optimum tower packing should provide. These are to yield as high a number of pieces per unit of volume, with as low a weight of packing as is feasible, so as to provide a maximum amount of surface area for every unit of weight of material expended to make the packing. Finally, the packing should be readily manufactured without any loss of material of construction.

As may be appreciated, the various aspects stressed above are all mutually related with each other, and I have therefore perceived that a realization of all these considerations should be directly related to the shape and design of the individual packed elements that comprise the randomly packed beds.

Having been guided by these requirements, I have discovered that an improved tower packing element comprising substantially all of the above cited features will result with a tower packing element surface or base that is produced or generated when a two-dimensional continuously progressing curve which passes through reverse curvature is rotated around a straight line that lies within the plane of the curve, and if the surface of the base that has thus resulted is endowed with slots and tongues depending away from the surface of said element and/or from selected of the slots. Specifically, as a typical case of a continuously progressing curve, a sine or cosine curve may be envisioned, for example. However, different as well as more complex functions may be envisioned as making up such a continuously progressing curve without limiting in any way the scope of the present invention. Basically, it appears therefore that a shape is generated that not only comprises longitudinal curvature that was produced by virtue of the rotation of the curve around the straight line in its plane, but the resulting shape will also display a characteristic curvature or curvatures which are directly related to the nature and functional identity of the curves themselves.

It is observed that in this way, a series of partial or half torus shapes are generated, which are all continuously connected to each other.

The slots mentioned earlier, as well as the depending tongues may be located either in a crest of a torus, or in the valley of a torus, as well as anywhere in between the crests or the valleys. Furthermore, some of the depending tongues may be of selected lengths and may point toward the inside of the torus, whereas other selected tongues may, for reasons of avoiding congestion and to provide a packed bed of better permeability to liquid and gas penetration, point in the opposite direction. With these considerations, an element is generated that is much less symmetrical than a piece in which the tongues would be extending from ordinary cylindrical or semi-cylindrical surfaces. As a consequence, the resulting packed bed which is obtained with the new packing is much more random than a bed composed of cylindrical, semi-cylindrical or other symmetrical pieces. Hence, in beds of the new packing, there is much less pattern packing and mutual blocking, and the packed surface area offered by the new packing is more readily available to serve mutual gas-liquid contact which means higher operating efficiency.

The angle through which the continuously progressing curve having reverse curvature is rotated around the straight line in its plane may vary from a very small angle to about 180 degrees. For most applications, the angle will be between 45 and 180 degrees. However, instances may occur with curves of appreciable complexity for which an angle between 10 and 90 degrees may be desirable.

When the packing is made of metal, it is most convenient to start with strip material, and using progressive dies, to cut out the openings, bend out the resulting tongues, and generally press the material into the series of demi-toroidal shapes described above. Thus, the material that constitutes the tongues originates from the parent strip material.

When the packings are made of plastics, it is convenient to use the usual injection dies and in one stroke generate the entire piece. Thus, it is obvious that in this way, and working in this manner, the depending tongues may be of the same length as the slots from which they depend, or they may be longer or shorter, and may even be of different shapes than the slots themselves. Moreover, it is clear that the material making up the tongues does not necessarily have to originate from the slots in any way.

It has already been stated that the tongues may be pointing away from the base surface in either direction. Whereas it is most common or frequent that the tongues do point toward the inside of the element, it has been found that since the new packing element comprises a series of demi-torus shapes in sequence, the tongues may be attached to the base surface in many different ways. Furthermore, selected tongues in any one element may be of different lengths. It has been found desirable to have selected tongues point upwardly and away from the inside of the base shape. This has been found particularly desirable with plastics where material thicknesses are usually heavier than with metals. However, upward-pointing tongues may also be used with metallic elements, when dictated by special features related to the characteristics of the continuously progressing curve passing through reverse curvature, or for other reasons, such as providing better permeability to the flow of liquid and gas through the bed. There are other reasons to have tongues point in both ways, such as more controlled spacing of the elements in the bed in relation to each other, as well as additional interlocking that may not be had with tongues pointing inwardly only.

Another important and novel feature of the new packings is that they may contain special longitudinally created slots from which no tongues as much are depending at all, but which slots are characterized by having more or less accentuated upturned rims which serve as short tongues. These special slots may be contained in pieces that are made of metal as well as plastics. With metals, their implementation is very simple, as the metal is merely slit and turned upward. With plastics, the mode of manufacture is different and is achieved in the course of the ordinary molding operation. The purpose of this slot feature is three-fold. First, it may be seen that with such a slot and the upturned edges, the mechanical strength of the packing element is greatly increased. Secondly, by virtue of the upturned rims, further important piece-to-piece contact points between adjoining pieces in the bed are achieved, which will improve the contacting efficiency still further. Thirdly, provision of such upturned edges will facilitate additional mutual interlocking of the pieces in the bed, and thus add to the mechanical stability of the bed. The upturned rims or edges may be serrated or smooth.

An additional feature which the invention may embody is that the normally plain terminal ends of the base may be turned upward or outward 90 degrees. These ends may also be serrated, and provision of these upturned edges may become desirable in some instances to give additional strength to the elements.

Having thus described some of the merits of the invention, further description will be continued with reference to the accompanying illustrations.

Figure 1:
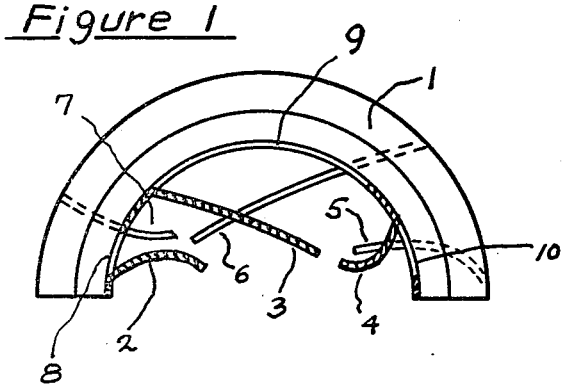
FIG. 1 is a frontal elevation of an element of the invention with partial sections removed to reveal some slots therein.
Figure 2:
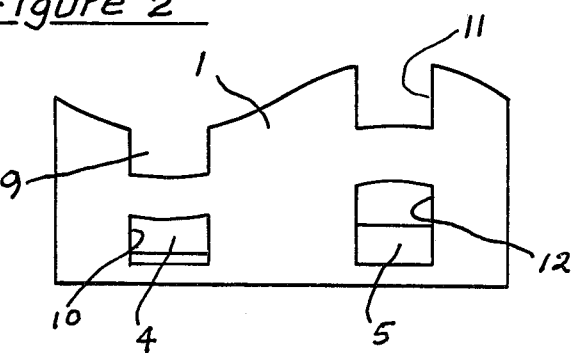
FIG. 2 shows a side view of the element shown in FIG. 1.

Referring to FIGS. 1 and 2, the base that comprises the series of demi-toroidal shapes is denoted by numeral 1. As may be seen, two demi-tori are in sequence. There are a total of six tongues. Tongues denoted by 2, 3 and 4 are depending from the concavely proceeding minor demi-torus, whereas tongues 5, 6 and 7 are depending from the convexly proceeding major demi-torus. Slots 8, 9 and 10 belong to the minor demi-torus, whereas the slots 11 and 12 are in the major demi-torus. As may be seen, the tongues depending from the minor and major demi-tori proceed in different directions, and are generally of different length, as well as of different length than the slots. Thus, the thoroughly irregular arrangement of the tongues is quite apparent.

Figure 3:
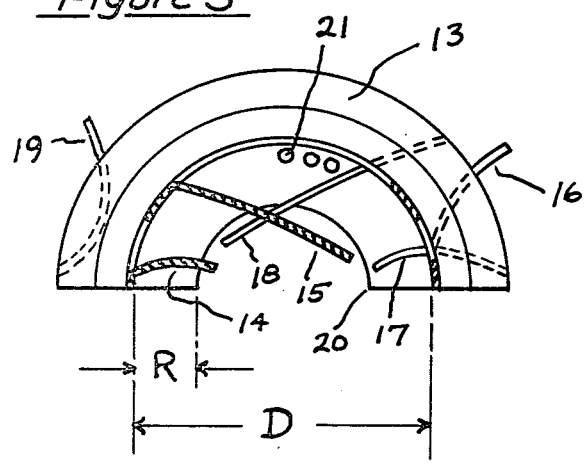
FIG. 3 is a frontal elevation of another typical element of the present invention with partial sections removed to reveal some of the slots.

Referring to FIG. 3, the base is denoted by 13 and the tongues in the concave minor demi-torus are identified by numerals 14, 15 and 16, and tongues 17, 18 and 19 are in the convex major demi-torus. It will be seen that tongues 16 and 19 are pointing upwardly and thereby minimize the congestion and provide the additional contact points mentioned earlier.

Also shown in FIG. 3 is the outline of a strenghtening rib 20 depending downwardly from the back end of element 13. It has been found convenient to employ, especially in wide pieces, more than one such strengthening rib. Besides adding rigidity to the element, these ribs will also give additional contact surface area, and in order to facilitate ready drainage of liquid that may be trapped, drain holes 21 may be provided. The depth of these strengthening ribs may become of importance. For best results, it is suggested that the depth of these ribs R is not less than one-sixth of their large diameter D.

Figure 4:
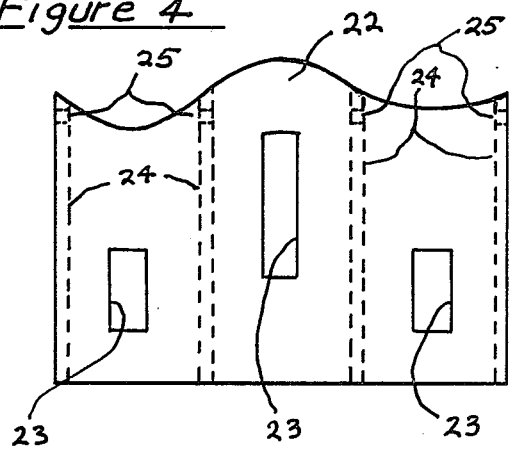
FIG. 4 is an end view of another embodiment of the tower packing element of the present invention having three demi-torus sections in series.

An implementation of the new packing element in which three demi-tori are employed in sequence is shown in FIG. 4. The base is denoted by numeral 22, and various slots by numeral 23. Strengthening ribs are shown as well and denoted by numeral 24, with drain holes 25. Whereas in FIG. 4 wherein three demi-tori are shown in sequence, it is entirely feasible to have a packing piece which employs a relatively larger number of such demi-tori in series, without departing from the spirit of the invention. In any such case, the depending tongues, either depending downwardly or upwardly, will be in a more random arrangement than they would be otherwise. Furthermore, it is also important to understand that the depths of the individual toroidal curves need not be identical, and that it is within the spirit of the invention to have an element that alternately employs deep and relatively shallow curves that define the demi-tori. This is indicated in FIG. 4 as well, and it will be noted that the amplitudes of the first two curves are relatively great, whereas that of the last or rightmost curve is considerably smaller.

Although not shown in the illustrations, it is also conceivable that the pitch and lengths of the curves forming the basis of the demi-torus bodies need not necessarily all be identical, and hence, curves of different shapes and configurations are acceptable for defining the demi-torus shapes, without violating the spirit of the invention.

Figure 5:
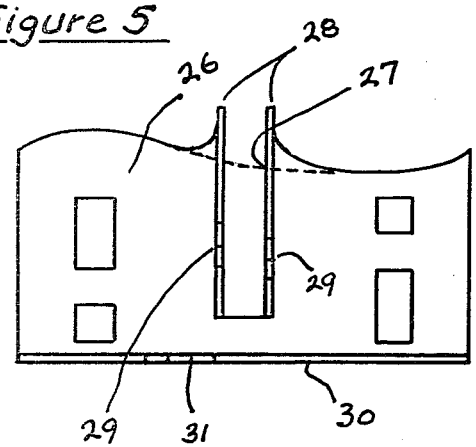
FIG. 5 is a view in end elevation of yet another embodiment of the tower packing element of the present invention.
Figure 6:
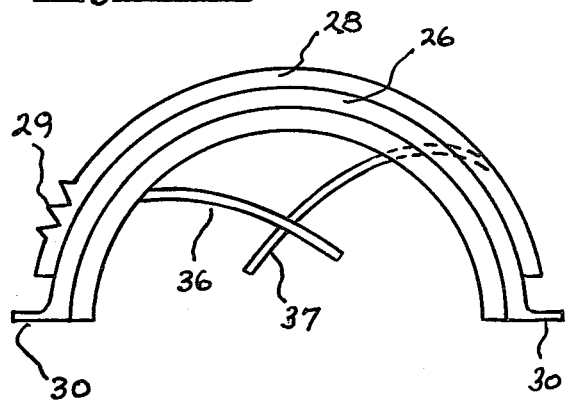
FIG. 6 is a view in front elevation of the element illustrated in FIG. 5.

Another implementation of the invention is shown in FIGS. 5 and 6. Two demi-toroidal sections are shown, comprising the base 26 with the dashed line merely showing the connection between the two tori. A slot 27 is shown between the two demi-toroidal parts, with upturned edges 28, which in effect provide short tongues. It will be noted that no tongues are depending from slot 27. In general, edges 28 may be plain, however, it is conceivable that the edges may be toothed or serrated edges, as shown by numeral 29. It is readily seen that by providing slot 27, the internal part of the base has been rendered much more accessible to fluid contact than if there were no slot, and at the same time, the mechanical strength of the element has been improved. Frequently, with this design, it is also desirable to provide a footing for the element by turning the terminal edges outward. This is shown by numeral 30. Again, these edges may or may not be serrated, as shown by numeral 31.

Only two tongues 36 and 37 are shown, and the unsymmetrical pattern that results with this construction is quite apparent.

Figure 7:
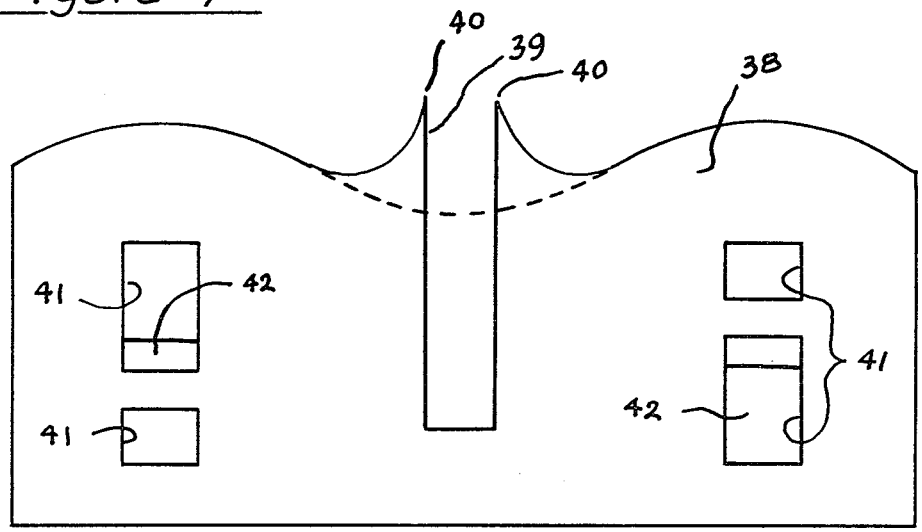
FIG. 7 is a view in end elevation of another embodiment of the tower packing element of the present invention.

Another version of the packing element of the present invention is shown in FIG. 7. The base 38 is composed of three demi-tori in series, with the dashed line indicating the connecting demi-torus between the outer two demi-tori. A central longitudinally progressing slot 39 is shown, progressing over a part of the base, and the rims 40 of the central slot are pointing upwardly and provide short tongues. Normal slots and tongues are indicated by numerals 41 and 42 respectively.

Figure 8:
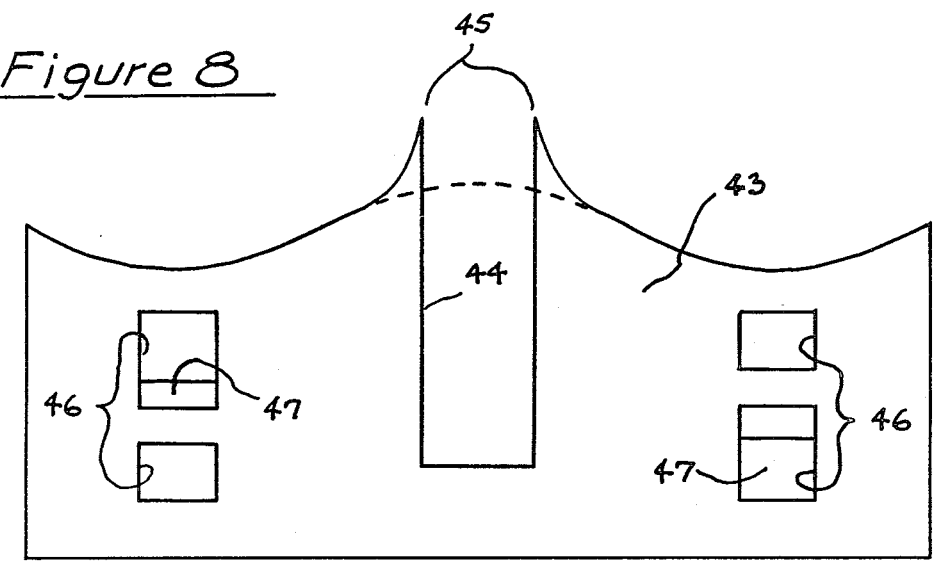
FIG. 8 is a view in end elevation of still another embodiment of the tower packing element of the present invention.

Still another version of this construction is shown in FIG. 8, but with curvatures in the base 43 reversed. The dashed line merely serves the purpose of indicating the course of the central demi-torus. The packing has a central longitudinally progressing slot 44, with rims 45 turned upwardly and thereby providing short tongues. Normal slots and tongues are indicated by numerals 46 and 47 respectively.

Whereas in the above FIGS. 5, 6, 7 and 8, only one central longitudinally progressing slot with upturned rims is indicated to be contained in the piece, it is entirely within the spirit of the invention that a packing element may contain a plurality of such slots with upturned rims.

Having discussed the illustrations which are pertinent to this invention, it is apparent that a tower packing element of much greater irregularity and much less symmetry has been created than is obtained with packings in which slots and tongues are provided on cylindrical or semi-cylindrical bodies. The fact that the resulting pieces are composed of series of demi-torus bodies from which tongues will depend from crests and valleys is particularly significant as a thoroughly random bed structure will result. Hence, the new packing should offer optimum surface area availability to fluid flow, and hence, optimum mass transfer characteristics.

Whereas all slots shown in the packing elements (including the slots with upturned rims) have been shown as rectangular, it is entirely in the spirit of the invention that they may have other shapes as well, such as trapezoidal, elongated with rounded ends, or zig-zag designs, for example. The shapes of the tongues may vary in similar fashion. As regards the lengths of the tongues contained in any one piece, these are usually of different lengths, generally, but not always, arranged in such a way that the shorter tongues are near the terminals of the packing and the longer tongues are in the center. Depending on the number of tongues contained in a piece, these are normally arranged in parallel rows, with tongues in adjacent rows proceeding in opposite directions. As far as the lengths of the tongues are concerned, they may vary from a relatively small fraction of the radius of the packing element to the length of the radius itself, or larger. The tongues may be either curved or straight.

As far as the texture of the material that comprises the base is concerned, it is desirable that this is generally smooth and even, and without small perforations to prevent resistance to ready drainage, and so as not to be a hindrance to clean operations.

Thus having described my invention, I claim the following:

1. A tower packing element for use in towers for distillations, gas absorptions and related mass transfer operations, comprising a base which has a surface that is generated by the rotation of a continuously progressing two-dimensional curve through an angle of from approximately 10 degrees to approximately 180 degrees around a straight line which lies within the plane of said curve to form a base surface consisting of at least two demi-tori in horizontal sequence, said base being provided with slots and having tongues depending from said base.

2. A tower packing element as claimed in claim 1, wherein the base surface of the tower packing element is generated by rotating the curve through an angular range of 45 to 180 degrees.

3. The tower packing element as claimed in claim 1, in which the slots and tongues in the base are arranged substantially in a crest of the base.

4. The tower packing element as claimed in claim 1, wherein the base is provided at selected positions with longitudinally progressing slots having their peripheral long edges turned upward and away from the inner part of the base.

* * * * *